(12) United States Patent
Leskow et al.

(10) Patent No.: US 6,908,286 B2
(45) Date of Patent: Jun. 21, 2005

(54) MAIN ROTOR SHAFT MOUNTED HYDRAULIC PRESSURE SYSTEM

(75) Inventors: David J. Leskow, Westport, CT (US); William J. Eadie, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 48 days.

(21) Appl. No.: 10/617,194

(22) Filed: Jul. 10, 2003

(65) Prior Publication Data

US 2005/0008490 A1 Jan. 13, 2005

(51) Int. Cl.$^7$ ............................................... B63H 1/00
(52) U.S. Cl. ................................................. 416/170 R
(58) Field of Search .......................... 416/170 R, 142, 416/143, 157 R, 95; 417/460, 461, 462; 92/58, 57

(56) References Cited

U.S. PATENT DOCUMENTS

| | | | |
|---|---|---|---|
| 2,703,147 A | * | 3/1955 | Peterson ..................... 416/98 |
| 3,762,276 A | * | 10/1973 | Gates ........................... 92/57 |
| 4,379,678 A | | 4/1983 | Carlock et al. |
| 4,534,704 A | | 8/1985 | McArdle |
| 4,946,354 A | | 8/1990 | Aubry |
| 5,154,371 A | | 10/1992 | Grant |
| 5,484,268 A | * | 1/1996 | Swank ......................... 417/462 |
| 5,826,822 A | | 10/1998 | Rehm |
| 5,934,875 A | | 8/1999 | Head |
| 6,047,924 A | | 4/2000 | Thomassin |
| 6,109,876 A | * | 8/2000 | Schreiber .................... 416/114 |
| 6,183,408 B1 | | 2/2001 | Wright |
| 6,361,278 B2 | | 3/2002 | Bansemir |
| 6,513,753 B1 | | 2/2003 | Toni et al. |

* cited by examiner

Primary Examiner—Edward K. Look
Assistant Examiner—Igor Kershteyn
(74) Attorney, Agent, or Firm—Carlson, Gaskey & Olds

(57) ABSTRACT

A rotor system includes a hydraulic pressure system located within a rotor shaft along an axis or rotation. The hydraulic pressure system is within the rotating field such that fluid pressure is generated and supplied from within the rotational field without the need to cross a rotational interface. Differential rotation between the rotor shaft and a standpipe rotates a hydraulic pump body relative a hydraulic pump shaft. The hydraulic pressure system is contained within a support structure so as to be readily mounted and removed from the rotor hub for replacement or maintenance. A gear system is mounted to the support structure between the standpipe and the hydraulic pump shaft to step-up or step-down the relative rotation between the rotor shaft and the standpipe.

24 Claims, 7 Drawing Sheets

MAIN ROTOR SHAFT MOUNTED HYDRAULIC PRESSURE SYSTEM

This invention was made with government support under Contract No.: NCC2-9016 awarded by the Department of the Army. The government therefore has certain rights in this invention.

BACKGROUND OF THE INVENTION

The present invention relates to a hydraulic pressure system mounted to a rotor hub assembly, and more particularly to a hydraulic pressure system mounted between a standpipe and a rotor shaft of a rotary wing aircraft.

Multi-element airfoils are in common use on fixed wing aircraft. Such applications, however, are either in a fixed configuration or activate at relatively slow rates. In conventional applications, the aerodynamic flow environment is steady or quasi-steady conditions.

Multi-element airfoil application to rotary-wing aircraft has concentrated upon individual blade control of each rotor blade wherein each rotor blade is pitched individually a multiple of times during each revolution of the rotor blade. Other multi-element applications utilize various slats, flaps and/or other aerodynamic surfaces that are selectively deployed from each rotor blade a multiple of times during each rotor blade revolution. These actuation systems provide numerous design challenges as significant power must be available to each rotor blade. The actuation system must also generate high flow rates to operate the actuation system a multiple of times during each revolution to provide individual blade control.

Conventional actuation systems utilize a remotely located hydraulic pressure system that feeds fluid pressure to each rotor blade through a hydraulic slip ring and conduit system. Disadvantageously, seals within the hydraulic slip ring may have an unacceptable service life. The numerous feed and return lines which are required to power the individual blade control of each rotor blade may also be relatively complicated and require significant maintenance. Moreover, hydraulic systems with pressures sufficient to provide the required actuation force and responsiveness require relatively large and heavy power systems.

Accordingly, it is desirable to provide a hydraulic pressure system for a rotor hub assembly which is powerful and generates high flow rates yet, is light in weight, compact and minimizes the communication of pressurized fluid through rotational interfaces.

SUMMARY OF THE INVENTION

The rotor system according to the present invention provides a hydraulic pressure system located within a rotor shaft along an axis or rotation. The hydraulic pressure system is within the rotating field such that fluid pressure is generated and supplied from within the rotational field without the need to cross a rotational interface.

The hydraulic pressure system includes a hydraulic pump body attached to the rotor shaft and a hydraulic pump shaft attached to a standpipe. Differential rotation between the rotor shaft and the standpipe rotates the hydraulic pump body relative the hydraulic pump shaft.

A support structure contains the hydraulic pressure system so as to be readily mounted and removed from the rotor hub for replacement or maintenance. A gear system is mounted to the support structure between the standpipe and the hydraulic pump shaft to step-up or step-down the relative rotation between the rotor shaft and the standpipe.

The present invention therefore provides a hydraulic pressure system for a rotor hub assembly which is powerful and generates high flow rates, yet is light in weight, compact, and minimizes the communication of pressurized fluid through rotational interfaces.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
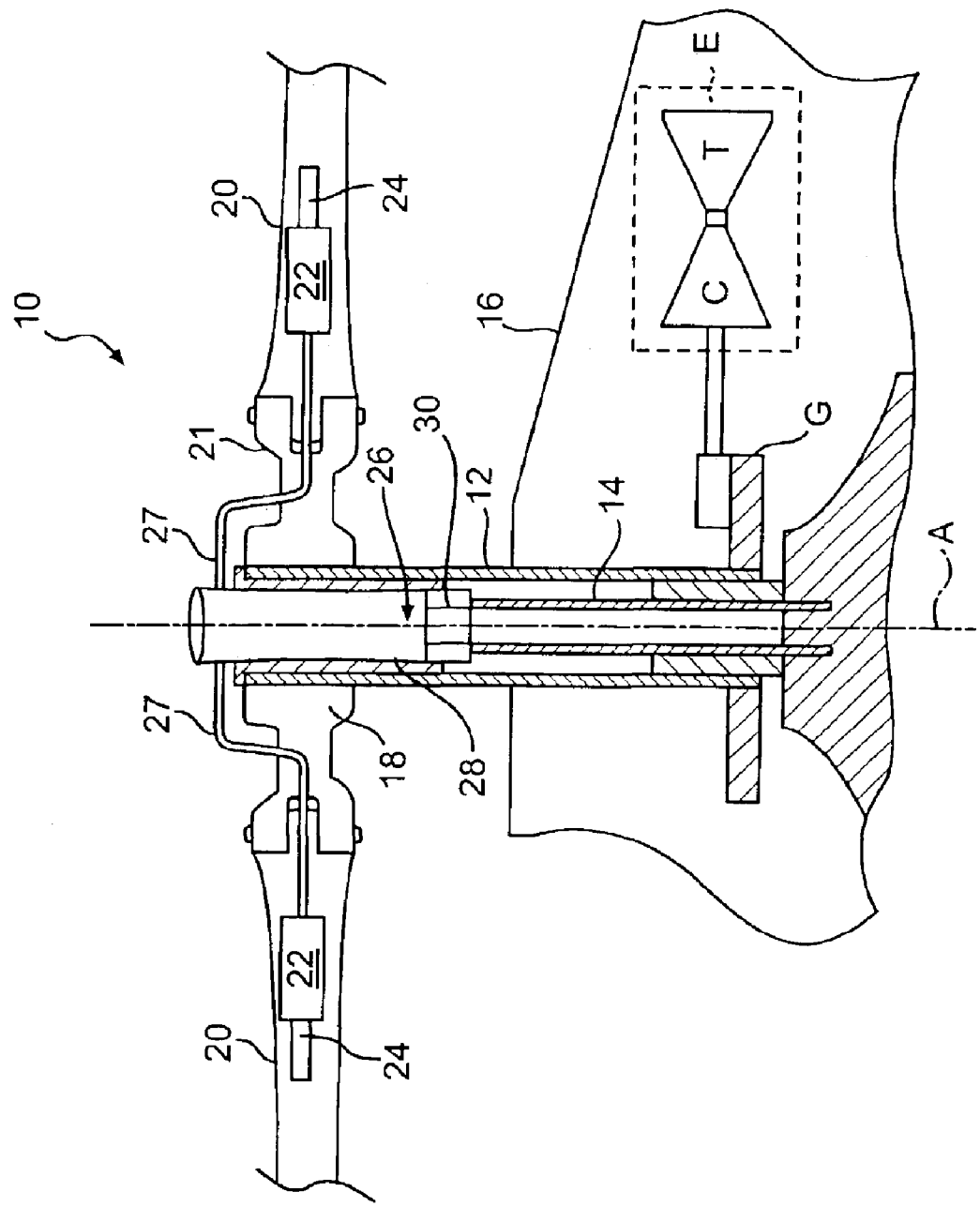
FIG. 1 is a general schematic view of a rotor head of an exemplary rotary wing aircraft embodiment for use with the present invention.

FIG. 1 illustrates a general schematic view of a rotor system 10. It should be understood that although a particular rotor system 10 is illustrated in the disclosed embodiment, other rotor systems for other vehicles such as helicopters, tilt-rotors, hybrid aircraft and conventional aircraft will also benefit from the present invention. A rotor shaft 12 is driven by an engine or engines E, typically through reduction gearing (illustrated schematically at G), for rotation about an axis of rotation A. The rotor shaft 12 is preferably a hollow tubular member and mounted concentric with a rotor standpipe 14. The standpipe 14 is rotationally fixed in position relative to a fuselage 16 and the rotor shaft 12 rotates about the standpipe 14.

A rotor hub 18 is mounted on the rotor shaft 12 for rotation therewith about axis A. The rotor hub 18 supports a multiple of rotor blades 20. Each rotor blade 20 preferably includes one or more hydraulically powered actuator systems (illustrated schematically at 22). The actuator systems 22 are preferably located within the rotor blade 20 and/or the rotor blade cuff 21 which mounts each rotor blade 20 to the rotor hub 18. In other words, the actuator systems 22 are mounted within the rotating field of the rotor system 10 and not fixed within the vehicle fuselage.

The actuator systems 22 drive an aerodynamic device (illustrated schematically at 24) such as slats, flaps an/or other aerodynamic surfaces on each rotor blade 20 to provide individual blade control of each rotor blade 20 during each revolution of the rotor blade. It should be understood that actuator systems 22 may alternatively or in addition operate to independently pitch each rotor blade 20 individually a multiple of times during each revolution to provide the individual blade control. The actuator system 22 may alternatively of additionally provide for other operations which take place upon the rotor hub 18 such as a blade folding mechanism.

A hydraulic pressure system 26 is preferably located within the rotor shaft 12 along the axis or rotation A. The hydraulic pressure system 26 is within the rotating field such that fluid pressure is generated and supplied directly to each actuator system 22 without the need to cross a rotational interface. Moreover, only relatively short communication conduits 27 from the hydraulic pressure system 26 to each actuator system 22 are required as both generation and communication of the high pressure fluid is contained within the rotating field.

Figure 2:
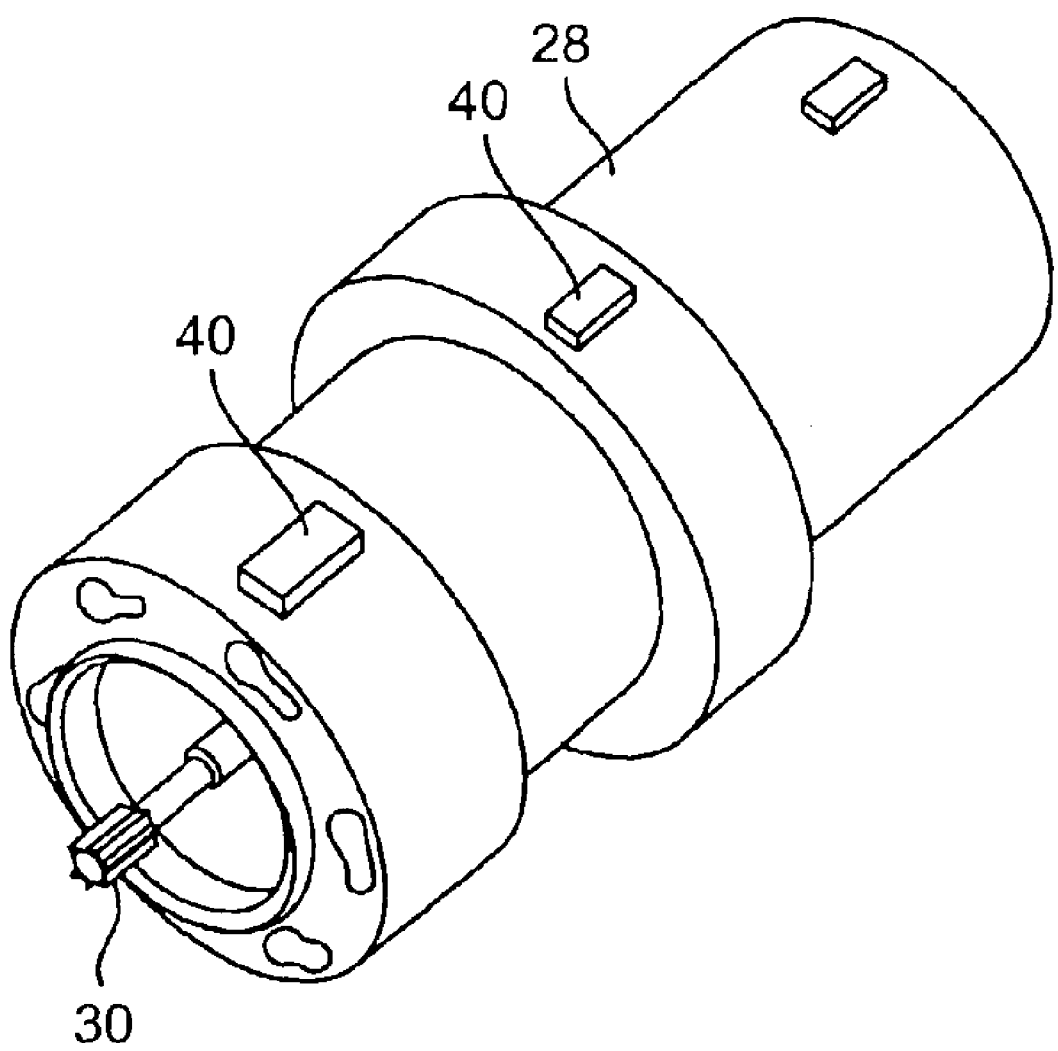
FIG. 2 is a perspective view of a hydraulic pump.

The hydraulic pressure system 26 includes a hydraulic pump having a hydraulic pump body 28 and a hydraulic pump shaft 30 (also illustrated in FIG. 2). The hydraulic pump is preferably a 30 HP, 16–20 gpm, 4500 rpm 1.88:1 pump, however, other pump will likewise benefit from the present invention. The hydraulic pump body 28 is attached to the rotor shaft 12 and the hydraulic pump shaft 30 is attached to the standpipe 14. Differential rotation between the rotor shaft 12 and the standpipe 14 drives the hydraulic pump body 28 relative the hydraulic pump shaft 30. It should be understood that a stationary and a counter-rotating standpipe will also benefit from the present invention. Moreover, other power systems such as an electrical generator will also benefit from the present invention.

Figure 3:
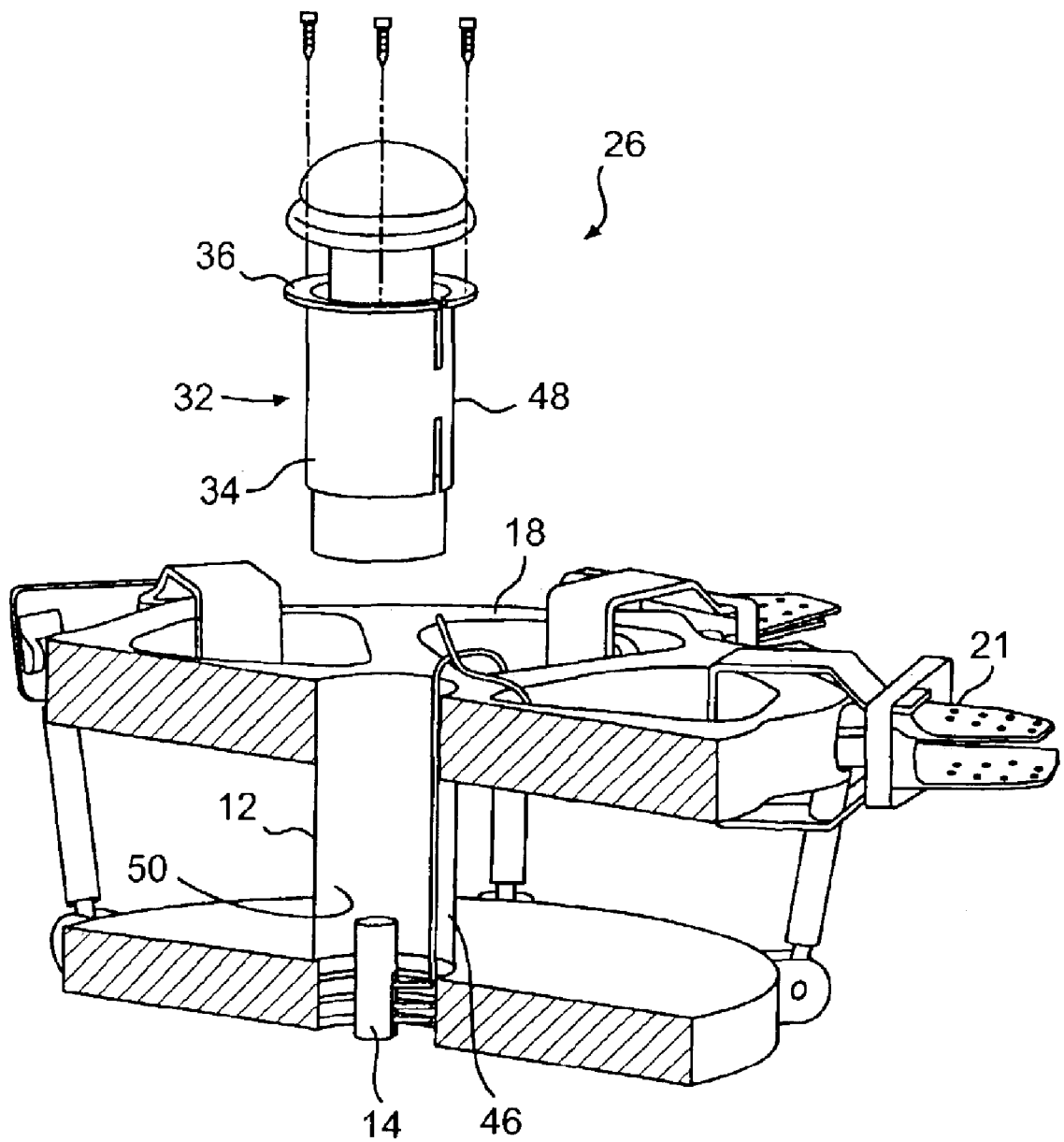
FIG. 3 is a perspective view of a hydraulic pressure system for mounting within a support structure for mounting within a rotor head.
Figure 4:
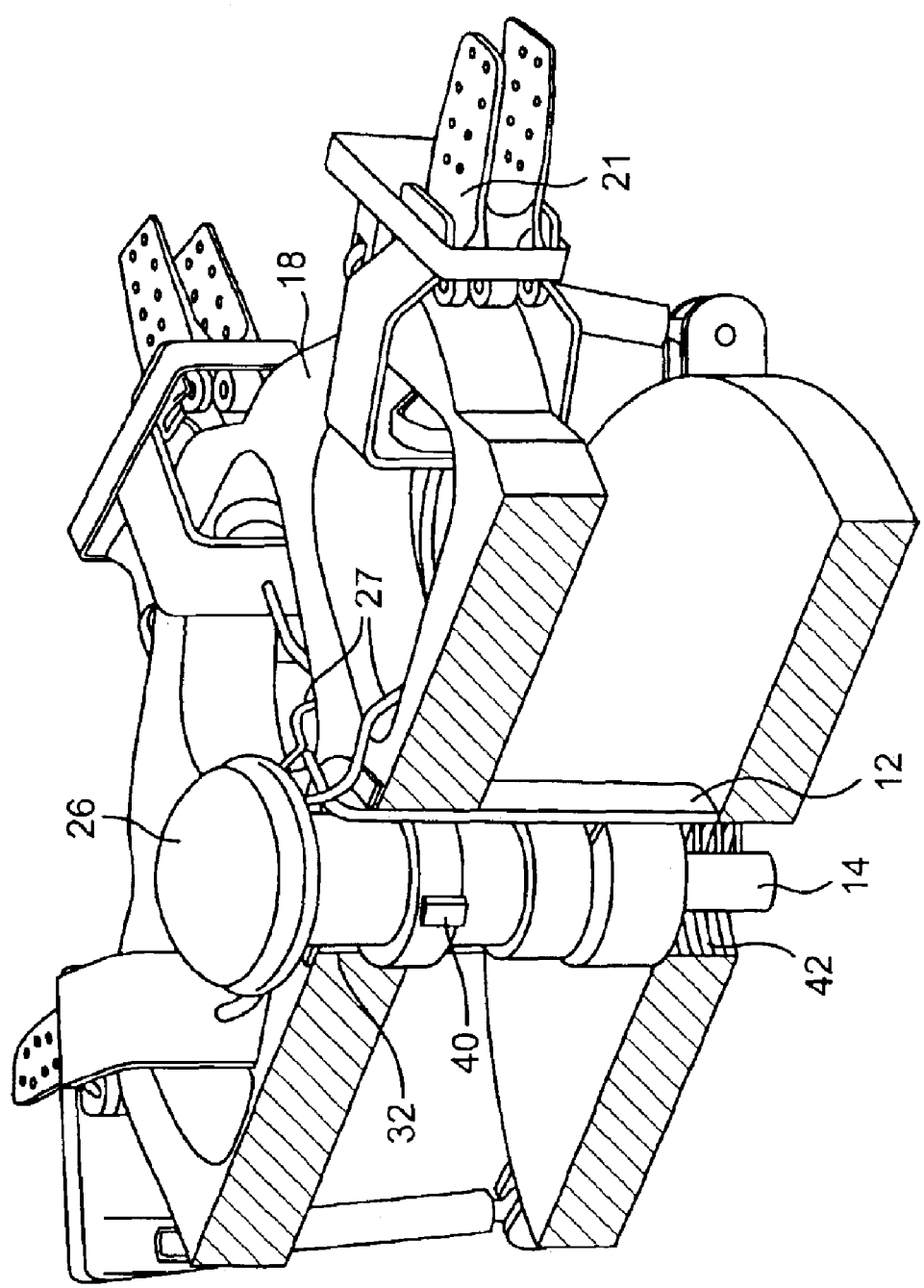
FIG. 4 is a perspective view of a hydraulic pressure system mounted within a support structure for mounting within a rotor head.

Referring to FIG. 3, the hydraulic pressure system 26 is preferably contained within a support structure 32 so as to be readily mounted and removed from the rotor hub 18 for replacement or maintenance. The support structure 32 includes a cylindrical member 34 having a flange 36 radially extending therefrom. The cylindrical member 34 slides at least partially through the rotor hub 18 and into the rotor shaft 12 (FIG. 4). The flange 36 mounts to a portion of the rotor hub 18 through fasteners 38 or the like.

Referring to FIG. 4, an anti-rotation feature 40 such as a slot and key arrangement assures the hydraulic pump body 28 is fixed against rotation within the support structure 32.

Figure 5:
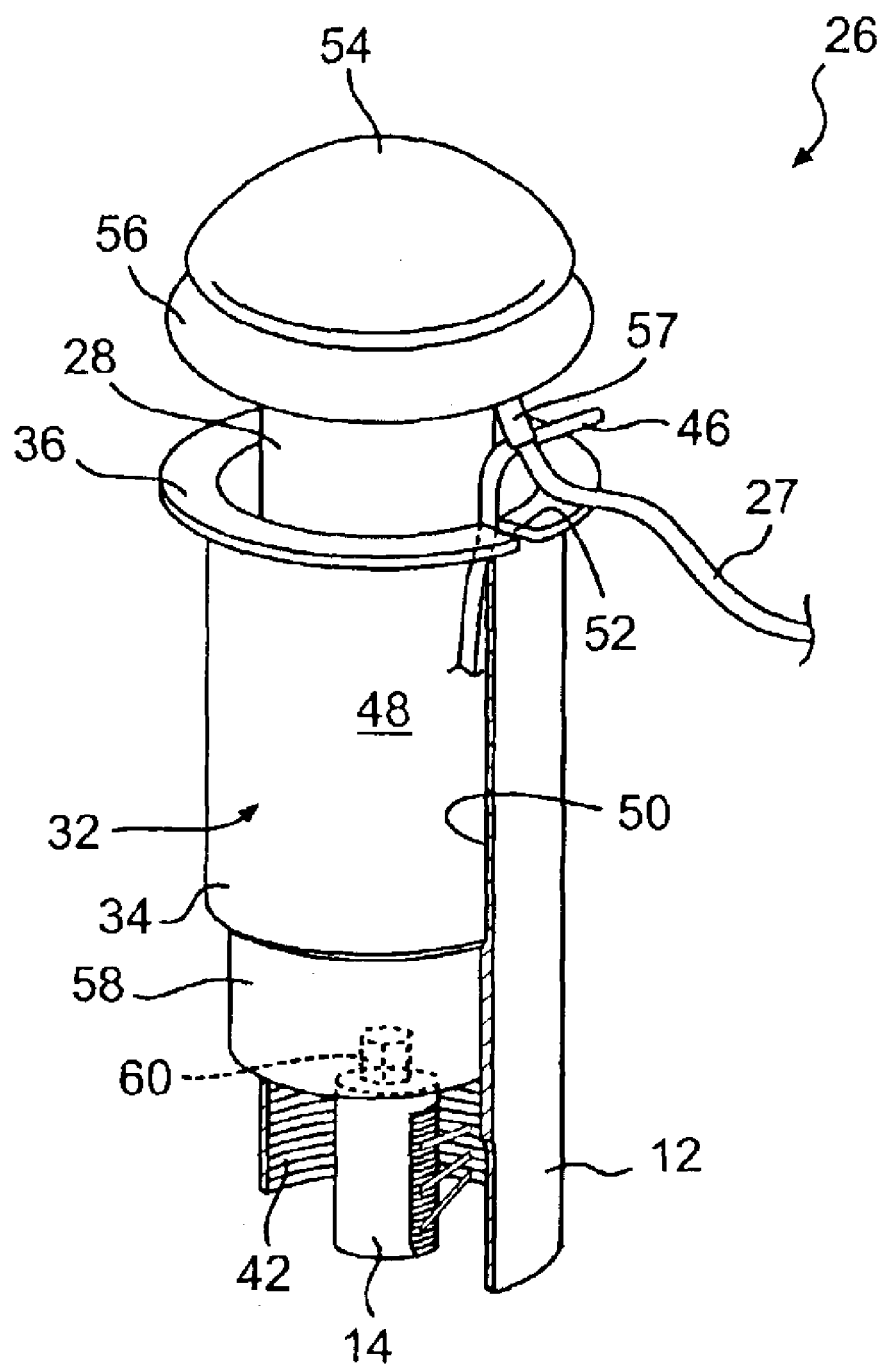
FIG. 5 is an expanded perspective view of a hydraulic pressure system.

A roll ring 42 preferably provides communication from the standpipe 14 (in the stationary field) to the hydraulic pressure system 26 (in the rotational field). The roll nng 42 preferably provides electrical power and communication within the rotational field through a wiring harness 46. The wiring harness 46 extends from the roll ring 42 and is preferably located between an outer wall 48 of the support structure 32 and the inner wall 50 of the rotor shaft 12 (FIG. 5). A notched cutout 52 within the flange 36 permits passage of the wiring harness 46 without requiring disassembly during removal/replacement of the support structure 32.

The wiring harness 46 transmits control signals to the hydraulic pressure system 26 and the individual actuator systems 22 for each blade 20 (FIG. 1) of the rotor system 10. It should be understood that other rotational interfaces will also benefit from the present invention. Moreover, other communication systems such as fiber optic bundles and/or other systems will also benefit from the present invention.

Referring to FIG. 5, a high-pressure fluid reservoir 54 and a low pressure fluid reservoir 56 are mounted directly to the hydraulic pump body 28. Preferably, the high-pressure fluid reservoir 54 and the lower pressure fluid reservoir 56 are relative streamlined in shape to minimize aerodynamic drag during rotation thereof. It should be understood that the high-pressure fluid reservoir 54 and the lower pressure fluid reservoir 56 may alternatively be contained wholly within the support structure 32.

Figure 6:
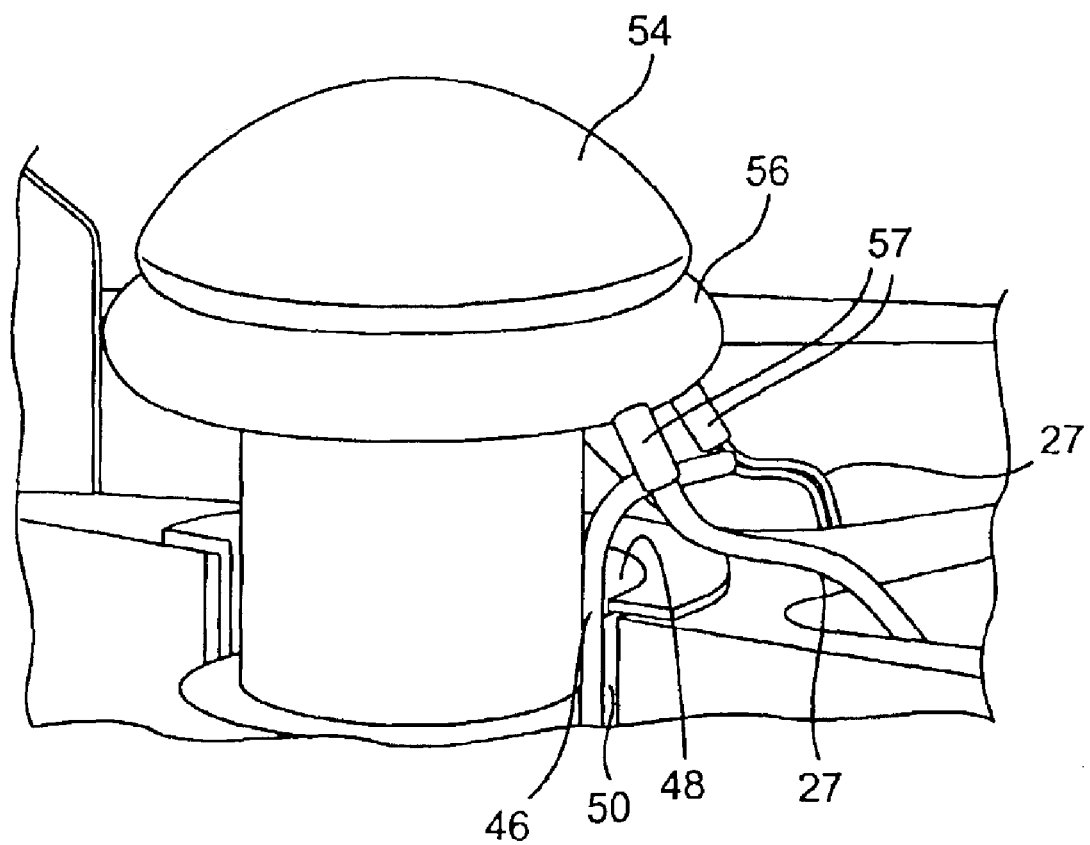
FIG. 6 is an expanded perspective view of an aerodynamically shaped high-pressure fluid reservoir and lower pressure fluid reservoir.

Quick detach couplings 57 (also illustrated in FIG. 6) extend from the fluid reservoirs 54, 56 to provide rapid connection and disconnection of the conduits 27 from the hydraulic pressure system 26. As the conduits 27 are relatively short arid as the hydraulic pressure system 26 is located primarily within the main shaft 12 and the support structure 32, and rotor hub, ballistic tolerance is enhanced.

A gear system 58 is mounted to the support structure 32. The gear system 58 couples the standpipe 14 and the hydraulic pump shaft 30. The gear system 58 is preferably a harmonic drive gear system, however, other gear systems which step-up or step-down the relative rotation between the rotor shaft 12 and the standpipe 14 will also benefit from the present invention.

Figure 7:
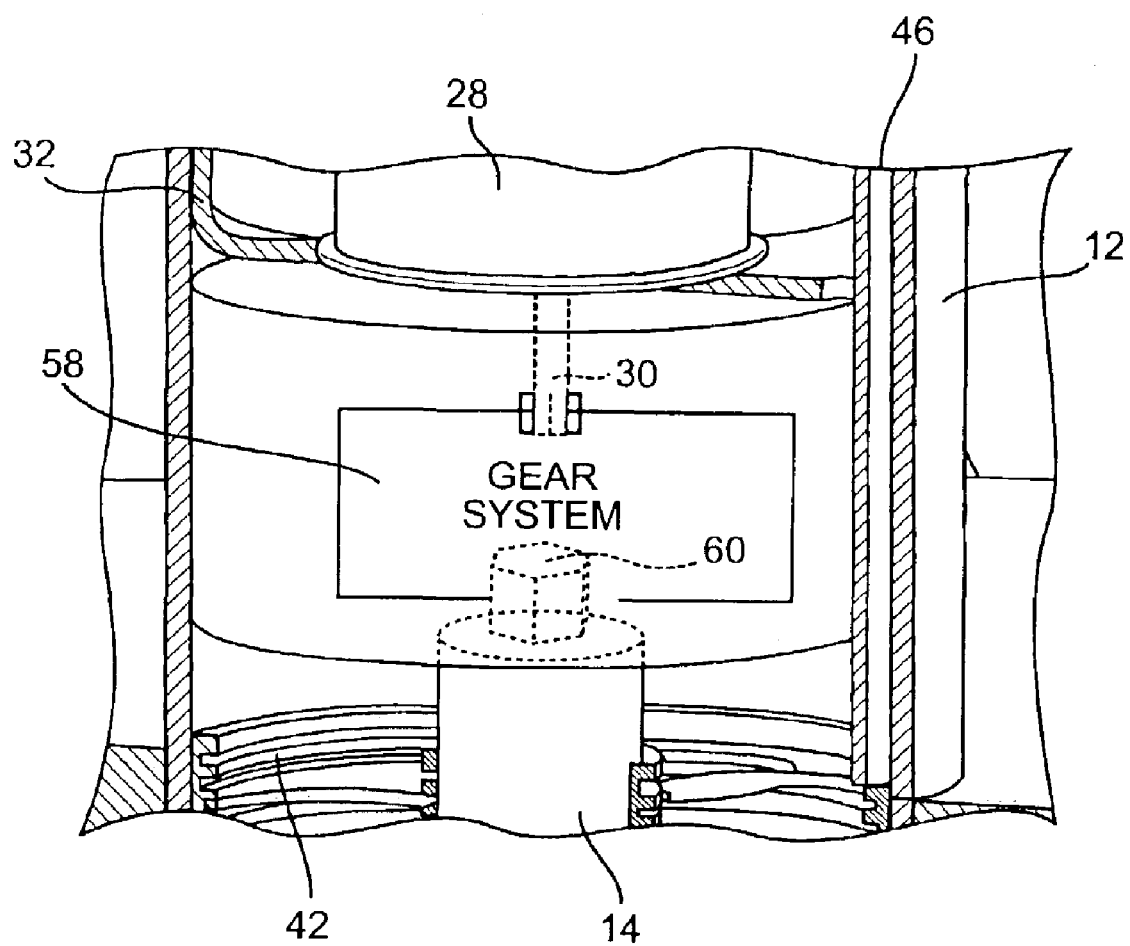
FIG. 7 is a perspective view of a hydraulic pressure system mounted to a stand pipe of a rotor system.

A sliding but non-rotational interface 60 provides engagement between the standpipe 14 and the gear system 58 when the support structure 32 is located within the rotor shaft 12 (also illustrated in FIG. 7). The non-rotational interface 60 provides a fastener free rotational coupling such that the gear system 58 need only slide onto the standpipe 14 during installation. The hydraulic pressure system 26 is thereby readily installed and removed as a unit supported by the support structure 32.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A hydraulic pressure system for a rotor hub assembly comprising:

a support structure defined along an axis said support structure removably mounted at least partially within the rotor hub assembly along an axis of rotation of the rotor hub assembly for rotation with the rotor hub assembly;

a hydraulic pump comprising a pump body and a pump shaft;

said pump body mounted within said support structure for rotation with said support structure relative to said pump shaft.

2. The hydraulic pressure system as recited in claim 1, wherein said support structure comprises a cylinder includes a flange radially extending therefrom.

3. The hydraulic pressure system as recited in claim 1, further comprising a high-pressure fluid reservoir and a lower pressure fluid reservoir mounted to said pump body, said high-pressure fluid reservoir and said lower pressure fluid reservoir streamlined in shape to minimize aerodynamic drag.

4. The hydraulic pressure system as recited in claim 1, further comprising a gear system which drives said pump shaft, said gear system including a sliding but non-rotational interface to provide a fastener-free rotational coupling between said gear system and a rotor standpipe.

5. The hydraulic pressure system as recited in claim 1, wherein said support structure comprises a flanged cylinder mounted within a main rotor shaft.

6. The hydraulic pressure system as recited in claim 1, wherein said support structure comprises a cylinder having a flange extending radially therefrom, said flange mounted to a rotor hub and said cylinder mounted within a main rotor shaft, a cylinder outer diameter of said cylinder spaced away from an inner diameter of said main rotor shaft.

7. The hydraulic pressure system as recited in claim 1, further comprising a gear system mounted between said pump shaft and a rotationally fixed standpipe.

8. A rotor hub assembly for a rotary wing aircraft comprising:
   a standpipe mounted along an axis of rotation;
   a main rotor shaft mounted concentric with said standpipe and along said axis of rotation,
   said main rotor shaft rotationally mounted relative said standpipe; and
   a hydraulic pump mounted along said axis of rotation, said hydraulic pump comprising a pump body mounted for rotation relative a pump shaft mounted to said standpipe.

9. The rotor hub assembly as recited in claim 8, wherein said standpipe is mounted for rotation opposite said main rotor shaft.

10. The rotor hub assembly as recited in claim 8, further comprising a flanged cylinder mounted within said main rotor shaft, said pump body mounted to said flanged cylinder.

11. The rotor hub assembly as recited in claim 8, further comprising a flanged cylinder mounted to a rotor hub assembly, said pump body mounted to said flanged cylinder.

12. The rotor hub assembly as recited in claim 8, further comprising a cylinder having a flange extending radially therefrom, said flange mounted to a rotor hub and said cylinder mounted within said main rotor shaft, a cylinder outer diameter of said cylinder spaced away from an inner diameter of said main rotor shaft.

13. The rotor hub assembly as recited in claim 12, further comprising a conduit passing between said cylinder outer diameter and said inner diameter of said main rotor shaft.

14. The rotor hub assembly as recited in claim 13, wherein said conduit comprises an electrical conduit.

15. The rotor hub assembly as recited in claim 13, wherein said conduit comprises a fiber optic cable.

16. The rotor hub assembly as recited in claim 8, further comprising a cylinder having a flange extending radially therefrom, said flange mounted to a segment of said main rotor shaft and said cylinder mounted within said main rotor shaft, a cylinder outer diameter of said cylinder spaced away from an inner diameter of said main rotor shaft.

17. The rotor hub assembly as recited in claim 16, further comprising a conduit passing between said cylinder outer diameter and said inner diameter of said main rotor shaft.

18. The rotor hub assembly as recited in claim 17, wherein said conduit comprises an electrical conduit.

19. The rotor hub assembly as recited in claim 17, wherein said conduit comprises a fiber optic cable.

20. The rotor hub assembly as recited in claim 8, further comprising a gear system mounted between said pump shaft and said standpipe.

21. The rotor hub assembly as recited in claim 8, further comprising a harmonic drive system mounted between said pump shaft and said standpipe.

22. A hydraulic pressure system for a rotor hub assembly comprising:
   a support structure defined along an axis, said support structure comprises a flanged cylinder mounted within a main rotor shaft;
   a hydraulic pump comprising a pump body and a pump shaft;
   said pump body mounted within said support structure for rotation relative said pump shaft.

23. A hydraulic pressure system for a rotor hub assembly comprising:
   a support structure defined along an axis, said support structure comprises a cylinder having a flange extending radially therefrom, said flange mounted to a rotor hub and said cylinder mounted within a main rotor shaft, a cylinder outer diameter of said cylinder spaced away from an inner diameter of said main rotor shaft;
   a hydraulic pump comprising a pump body and a pump shaft;
   said pump body mounted within said support structure for rotation relative said pump shaft.

24. A hydraulic pressure system for a rotor hub assembly comprising:
   a support structure defined along an axis;
   a hydraulic pump comprising a pump body and a pump shaft;
   a gear system mounted between said pump shaft and a rotationally fixed standpipe;
   said pump body mounted within said support structure for rotation relative said pump shaft.

* * * * *